United States Patent [19]

Matsuda et al.

[11] Patent Number: 5,171,073
[45] Date of Patent: Dec. 15, 1992

[54] HYDRAULIC PRESSURE CONTROL SYSTEM WITH THREE PORT SPOOL VALVE

[75] Inventors: Shohei Matsuda; Jiro Suzuki; Kazutoshi Tashima; Takeshi Kojima; Kohichi Furuya; Masaaki Myoi, all of Saitama, Japan

[73] Assignee: Honda Giken Kogyo Kabushiki Kaisha, Tokyo, Japan

[21] Appl. No.: 608,936

[22] Filed: Nov. 5, 1990

[30] Foreign Application Priority Data

Nov. 7, 1989 [JP] Japan .................. 1-289048
May 30, 1990 [JP] Japan .................. 2-140726

[51] Int. Cl.$^5$ .............................................. B60T 8/32
[52] U.S. Cl. ............................ 303/115.4; 303/116.1
[58] Field of Search .................. 303/113 TR, 115 PP, 303/115 FM, 116 R, 117, 113 R, DIG. 6, 119 R; 188/358

[56] References Cited

U.S. PATENT DOCUMENTS

| | | | |
|---|---|---|---|
| 4,755,008 | 7/1988 | Imoto et al. | 303/24.1 X |
| 4,765,692 | 8/1988 | Miyake | 303/115 PP |
| 4,964,680 | 10/1990 | Nokubo et al. | 303/117 X |
| 4,995,677 | 2/1991 | Matsuda et al. | 303/52 X |

FOREIGN PATENT DOCUMENTS

| | | |
|---|---|---|
| 0114502 | 8/1984 | European Pat. Off. |
| 0229841 | 7/1987 | European Pat. Off. |
| 0388134 | 9/1990 | European Pat. Off. |
| 55-63944 | 5/1980 | Japan |
| 62-116346 | 5/1987 | Japan |
| 0119459 | 5/1989 | Japan ................ 303/115 PP |
| 2064036 | 6/1981 | United Kingdom |
| 2193544 | 2/1988 | United Kingdom ...... 303/DIG. 6 |

Primary Examiner—Matthew C. Graham
Assistant Examiner—Josie A. Ballato
Attorney, Agent, or Firm—Armstrong & Kubovcik

[57] ABSTRACT

A hydraulic pressure control system has a hydraulic pressure control valve which includes a spool slidably received in a housing for axial sliding movement between a rear position in which it permits the communication between an output port and a release port and a front position in which it permits communication between an input port and the output port. The hydraulic pressure control system also has a reaction chamber connected to the output port for providing a hydraulic pressure for biasing the spool rearwardly, and an input pressure working chamber for providing a hydraulic pressure for biasing the spool forwardly, a differential pressure regulating valve is interposed between the output port and the reaction chamber and adapted to be opened in response to the hydraulic pressure from the output port becoming higher than the hydraulic pressure in the reaction chamber by a predetermined value therefor. At an initial stage of the beginning of application of the hydraulic pressure to the input pressure working chamber, the application of the hydraulic pressure to the reaction chamber is cut off, so that the output hydraulic pressure from the output port can be rapidly increased with the spool kept located in the front position to provide a smooth initial operation of the hydraulically operated device connected to the output port.

4 Claims, 5 Drawing Sheets

HYDRAULIC PRESSURE CONTROL SYSTEM WITH THREE PORT SPOOL VALVE

BACKGROUND OF THE INVENTION

1. Field of the Invention

The field of the present invention is hydraulic pressure control systems having a hydraulic pressure control valve including a housing with an output port connected to hydraulically operated devices, an input port communicating with a hydraulic pressure supply source and a release port communicating with a reservoir, a spool slidably received in the housing for axial movement between a rear position in which it permits communication between the output port and the release port and a front position in which it permits the communication between the input port and the output port, a reaction chamber defined in the housing to exhibit a hydraulic pressure for biasing the spool rearwardly and connected to the output port, and an input pressure working chamber defined in the housing to exhibit a hydraulic pressure for biasing the spool forwardly.

2. Description of the Prior Art

Such a hydraulic pressure control system is conventionally known, for example, from Japanese Patent Application Laid-open No. 116346/87.

In such a hydraulic pressure control system, the output port is connected to the reaction chamber. When the hydraulic pressure supply source is put into communication with the output port in response to the advancing movement of the spool according to a braking operation, a hydraulic pressure from the hydraulic pressure supply source is immediately applied to the reaction chamber so that the output hydraulic pressure from the hydraulic pressure control valve is increased in proportion to the amount of braking operation from the initial stage of the braking operation. In the system, however, the hydraulic braking pressure is relatively small at the initial stage of the braking operation and in some cases, the braking operation of a brake device such as the hydraulically operated device may not be smooth.

SUMMARY OF THE INVENTION

Therefore, it is an object of the present invention to provide a hydraulic pressure control system in which the output hydraulic pressure from the hydraulic pressure control valve can be rapidly increased at the initial stage of the operation to provide smooth initial operation of the hydraulically operated device.

To achieve the above object, according to a first aspect of the present invention, a differential pressure regulating valve is interposed between the output port and the reaction chamber and adapted to be opened in response to the hydraulic pressure from the output port becoming higher than the hydraulic pressure in the reaction chamber by a predetermined value.

With the construction according to the above first aspect, the differential pressure regulating valve remains closed until the hydraulic pressure from the output port in the hydraulic pressure control valve becomes higher than the hydraulic pressure in the reaction chamber by the predetermined value. This ensures that the hydraulic pressure from the output port is not applied to the reaction chamber at the initial stage of the start of application of the hydraulic pressure to the input pressure working chamber and therefore, the spool remains advanced, so that the hydraulic pressure from the output port can be rapidly increased to provide a smoothed initial operation of the hydraulically operated device.

According to a second aspect of the present invention, the hydraulic pressure control valve is provided with a shut-off valve interposed between the reaction chamber and the reservoir and adapted to be closed in response to the forward movement of the spool.

With the construction according to the second aspect, the function of the shut-off valve enables the hydraulic pressure in the reaction chamber to be released.

According to a third aspect of the present invention, a one-way valve is connected in parallel to the differential pressure regulating valve for permitting only the flow of working oil (for example, brake fluid) toward the output port.

With the construction according to the third aspect, the function of the one-way valve enables the hydraulic pressure in the reaction chamber to be released.

Further, according to a fourth aspect of the present invention, the hydraulically operated device is a brake device; a hydraulic pressure generating means connected to a brake pedal and capable of producing a hydraulic pressure according to the amount of brake pedal operation is connected to the input pressure working chamber in the hydraulic pressure control valve; a unidirectional hydraulic pressure transmitting means, interposed between the brake device and the reaction chamber, the transmitting means is arranged to transmit the hydraulic pressure of the reaction chamber to the brake device while to cut off the flowing of working fluid from the brake device toward the reaction chamber even when the hydraulic pressure in the hydraulic pressure supply source is abnormally reduced; and an on-off valve is interposed between the hydraulic pressure generating means and the brake device and adapted to be closed in response to an increase in output hydraulic pressure from the output port.

With the construction according to the fourth aspect, if the hydraulic pressure from the hydraulic pressure supply source is normal, then the spool is operated by the hydraulic pressure applied from the hydraulic pressure generating means to the input pressure working chamber in response to the operation of the brake pedal, and the hydraulic pressure from the hydraulic pressure supply source is controlled in accordance with the amount of operation of the brake pedal and is delivered through the output port. This causes the on-off valve to be closed, so that the hydraulic pressure from the hydraulic pressure control valve is applied to the brake device through the unidirectional hydraulic pressure transmitting means. If the hydraulic pressure from the hydraulic pressure supply source is abnormally reduced, then the on-off valve is opened in response to the output hydraulic pressure from the hydraulic pressure control valve being abnormally reduced, so that the hydraulic pressure from the hydraulic pressure generating means can be applied directly to the brake device. Moreover, even when the output hydraulic pressure from the hydraulic pressure control valve is abnormally reduced, the working oil is prevented by the unidirectional hydraulic pressure transmitting means from reversely flowing toward the hydraulic pressure control valve.

The above and other objects, features and advantages of the invention will become apparent from the following description of the preferred embodiments, taken in conjunction with the accompanying drawings.

DESCRIPTION OF THE PREFERRED EMBODIMENTS

The present invention will now be described with reference to the accompanying drawings by way of embodiments in which the present invention is applied to a hydraulic braking pressure control system of a front engine and front drive vehicle.

Figure 1:
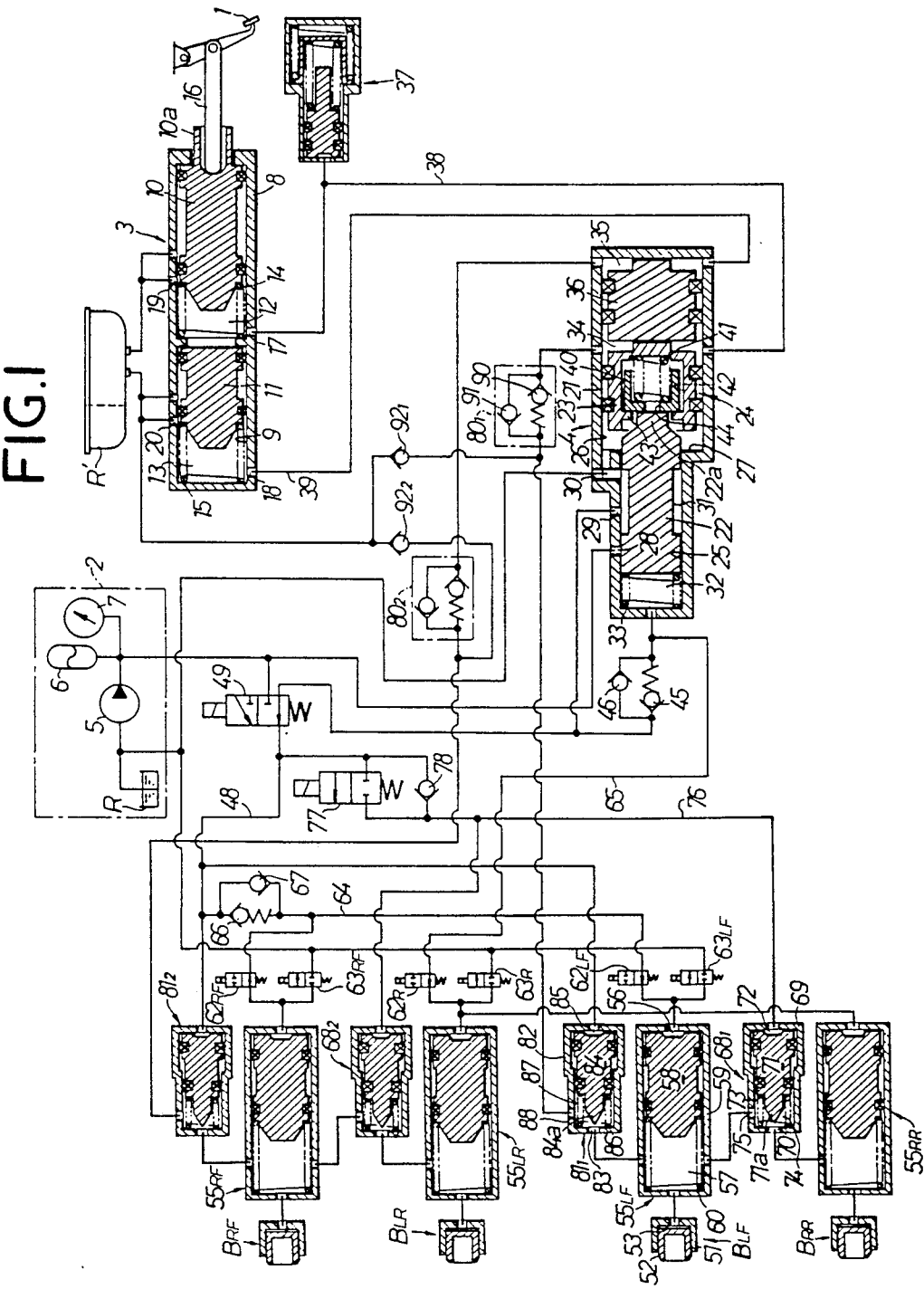
FIG. 1 is a schematic diagram of an entire hydraulic circuit of a first embodiment of the instant invention.

Referring first to FIG. 1 illustrating a first embodiment of the present invention, a left front wheel brake device $B_{LF}$ and a right front wheel brake device $B_{RF}$, as hydraulically-operated devices are mounted on left and right front wheels, respectively, and a left rear wheel brake device $B_{LR}$ and a right rear wheel brake device $B_{RR}$ as hydraulically-operated devices are mounted on left and right rear wheels, respectively. A hydraulic pressure generating means 3 is connected to a brake pedal 1 for producing a hydraulic pressure according to the amount of depression of the brake pedal 1 and the output hydraulic pressure from a hydraulic pressure supply source 2 is controlled by a hydraulic pressure control valve 4 in accordance with a hydraulic pressure produced from the hydraulic pressure generating means 3. During normal braking, a hydraulic pressure corresponding to the output hydraulic pressure from the hydraulic pressure control valve 4 is applied equally to the left front wheel brake device $B_{LF}$ and the right rear wheel brake device $B_{RR}$ and equally to the right front wheel brake device $B_{RF}$, and the left rear wheel brake device $B_{LR}$. The brake devices $B_{LF}$, $B_{RR}$, $B_{RF}$ and $B_{LR}$ are adapted to be independently controlled during an anti-lock control and during a traction control. Further, when the output hydraulic pressure from the hydraulic pressure supply source 2 is abnormally reduced, i.e., when the output hydraulic pressure from the hydraulic pressure control valve 4 is abnormally reduced, the hydraulic pressure according to the amount of brake pedal depressed is applied from the hydraulic pressure generating means 3 to each of the brake devices $B_{LF}$, $B_{RR}$, $B_{RF}$ and $B_{LR}$.

The hydraulic pressure supply source 2 comprises a hydraulic pump 5 for pumping working oil from a reservoir R, an accumulator 6 connected to the hydraulic pump 5, and a pressure switch 7 for controlling the operation of the hydraulic pump 5.

The hydraulic pressure generating means 3 is a so called tandem type master cylinder and comprises a cylinder body 8 cylindrically formed with its opposite ends closed. A first working piston 10 and a second working piston 11 which is spaced forward of the first working piston 10 are slidably received in a cylinder bore 9 provided in the cylinder body 8. A first hydraulic pressure chamber 12 is defined between the first and second working pistons 10 and 11, and a second hydraulic pressure chamber 13 is defined between the front end wall of the cylinder bore 9 and the second working piston 11. A first return spring 14 is contained in the first hydraulic pressure chamber 12 for exhibiting a spring force for biasing the first working piston 10 rearwardly, and a second return spring 15 is contained in the second hydraulic pressure chamber 13 for biasing the second working piston 11 rearwardly.

The first working piston 10 is integrally provided with a piston rod 10a which extends oil-tightly and movably through the rear end wall of the cylinder bore 9 and projects outwardly, and the front end of an urging rod 16 connected to the brake pedal 1 abuts against the rear end of the piston rod 10a. Thus, the first working piston 10 advances within the cylinder bore 9 in response to the braking operation of the brake pedal 1, and the second working piston 11 is operated to advance by the development of the hydraulic pressure in the first hydraulic pressure chamber 12 according to the advancing operation of the first working piston 10. In response thereto, a hydraulic pressure is developed in the second hydraulic pressure chamber 13.

The cylinder body 8 is provided with a first output port 17 for the first hydraulic pressure chamber 12 and a second output port 18 for the second hydraulic pressure chamber 13. The body is also provided with communication ports 19 and 20 which permit the corresponding hydraulic pressure chambers 12 and 13 to communicate with a second reservoir R' only when first and second working pistons 10 and 11 have been returned to a retreat limit.

The hydraulic pressure control valve 4 comprises a housing 21, a spool 22 and an urging piston 23 both slidably received in the housing 21, and a pressure absorbing means 24.

The housing 21 is basically formed into a cylindrical shape with its opposite ends closed and is provided with, from the front end side (left end side as viewed in FIG. 1), a first cylinder bore 25 with its front end closed, and a second cylinder bore 26 with its rear end closed. The second cylinder bore 26 has a diameter larger than that of the first cylinder bore 25 and is coaxially connected to the rear end of the first cylinder bore 25. There is a step 27 between the first and second cylinder bores 25 and 26. Moreover, the housing 21 is provided with an input port 28, an output port 29 and a release port 30. The parts 28, 29, 30 are opened in an inner surface of the first cylinder bore 25 at distances is sequence from the front end side toward the rear end side thereof. The input port 28 is connected to the hydraulic pressure supply source 2 for receiving the pressure generated thereat, and the release port 30 is directly connected to the reservoir R.

The spool 22 is slidably received in the first cylinder bore 25. Moreover, an outer surface of the spool 22 is provided with an annular groove 31 which is in communication with the output port 29 all the time. The axial length of the annular groove 31 is set such that when the spool 22 is in a rear position as shown in FIG. 1, it permits communication between the output port 29 and the release port 30 and when the spool 22 is in a front position, it permits communication between the output port 29 and the input port 28.

A reaction chamber 32 is defined between the front end of the spool 22 and the front end wall of the first cylinder bore 25, and a return spring 33 is contained in the reaction chamber 32 for biasing the spool 22 rearwardly.

The urging piston 23 is slidably received in the second cylinder bore 26. A piston 36 is also slidably received in the second cylinder bore 26 to define a first input pressure working chamber 34 between the piston 36 and the urging piston 23 and to define a second input pressure working chamber 35 between the piston 36 and the rear end wall of the second cylinder bore 26. The first input pressure working chamber 34 is connected to the first output port 17 in the hydraulic pressure generating means 3 through an oil passage 38. Accumulator 37 is connected to an intermediate portion of the oil passage 38. The second input pressure working chamber 35 is connected to the output port 18 in the hydraulic pressure generating means 3 through an oil passage 39.

A pressure absorbing means 24 comprises the urging piston 23, a damper piston 40 slidably received in the urging piston 23 for sliding movement relative to the urging piston 23 to abut against the rear end of the spool 22, and a damper spring 41 provided under compression between the damper piston 40 and the urging piston 23.

The urging piston 23 is provided with a bottomed slide bore 42 opened toward the spool 22, and integrally provided with a regulating collar 43 projecting radially inwardly from the opened end of the slide bore 42. The rear end of the spool 22 is coaxially and integrally provided with a small diameter abutment projection $22a$ capable of extending through the regulating collar 43 into the slide bore 42. The damper piston 40 is formed into a bottomed cylindrical shape and slidably received in the slide bore 42 for sliding movement and its closed end abuts against the abutment projection $22a$. The damper piston 40 is capable of sliding relative to the urging piston 23 between a position in which it abuts against the closed end of the slide bore 42 and a position in which it abuts against the regulating collar 43, and the preset load of the damper spring 41 is set larger than that of the return spring 33. The damper piston 40 is provided at its closed end with a communication hole 44 for avoiding the increase and decrease in hydraulic pressure between the damper piston 40 and the urging piston 23. The communication hole 44 is connected to the release port 30 through a chamber between the spool 22 and the urging piston 23.

The output port 29 and the reaction chamber 32 are interconnected through a first differential pressure regulating valve 45 which is opened in response to the hydraulic pressure in the output port 29 increasing by a predetermined value over the hydraulic pressure in the reaction chamber 32 to permit only the flow of the working oil from the output port 29 toward the reaction chamber 32. A first one-way valve 46 is connected in parallel to the first differential pressure regulating valve 45 and permits only the flow of the working oil from the reaction chamber 32 toward the output port 29. The differential pressure for opening the first one-way valve 46 is set at an extremely low level.

In the hydraulic pressure control valve 4, the rearward spring force of the return spring 33 and the rearward hydraulic pressure from the reaction chamber 32 act on the spool 22. On the other hand, the forward hydraulic pressure acting on the urging piston 23, from the first and second input pressure working chambers 34 and 35, acts on the spool 22 through the pressure absorbing means 24, so that the spool 22 is moved axially to balance the rearward force and the forward hydraulic pressure.

When the forward hydraulic pressure overcomes the rearward force to move the spool 22 to a front side, the output port 29 and input port 28 are put into communication with each other. When the rearward force overcomes the forward hydraulic pressure to move the spool rearwardly, the output port 29 and the release port 30 are put into communication with each other.

A traction-controlling solenoid switchover valve 49 is interposed between the output port 29 in the hydraulic pressure control valve 4 as well as the hydraulic pressure supply source 2 and an oil passage 48 and is capable of being switched over between a position in which it puts the output port 29 into communication with the oil passage 48 in its deenergized state and a position in which it puts the hydraulic pressure supply source 2 into communication with the oil passage 48 in its energized state.

Each of the brake devices $B_{LF}$, $B_{RF}$, $B_{LR}$ and $B_{RR}$ comprises a cylinder 51 and a braking piston 52 slidably received in the cylinder 51, and a braking force is exhibited by the movement of the braking piston 52 according to the hydraulic pressure applied to a hydraulic braking pressure chamber 53 defined between the cylinder 51 and the braking piston 52.

Unidirectional hydraulic pressure transmitting means $55_{LF}$, $55_{RF}$, $55_{LR}$ and $55_{RR}$ are connected to the brake devices $B_{LF}$, $B_{RF}$, $B_{LR}$ and $B_{RR}$, respectively. The unidirectional hydraulic pressure transmitting means $55_{LF}$, $55_{RF}$, $55_{LR}$ and $55_{RR}$ all have basically the same construction and hence, the construction of only the unidirectional hydraulic pressure transmitting means $55_{LF}$ will be described below.

The unidirectional hydraulic pressure transmitting means $55_{LF}$ comprises a free piston 58 slidably received in a cylinder 59 with its opposite ends faced to an input hydraulic pressure chamber 56 and an output hydraulic pressure chamber 57, respectively. A spring 60 is contained in the output hydraulic pressure chamber 57 for biasing the free piston 58 toward the input hydraulic pressure chamber 56.

Such construction of the unidirectional hydraulic pressure transmitting means $55_{LF}$ ensures that a hydraulic pressure according to the hydraulic pressure applied to the input hydraulic pressure chamber 56 can be delivered from the output hydraulic pressure chamber 57. The output hydraulic pressure chamber 57 is put into communication with the hydraulic braking pressure chamber 53 in the brake device $B_{LF}$ while ensuring a state where the hydraulic pressure in the output hydraulic pressure chamber 57 does not flow toward the input hydraulic pressure chamber 56.

Each of the unidirectional hydraulic pressure transmitting means $55_{LF}$, $55_{RF}$, $55_{LR}$ and $55_{RR}$ functions to transmit the hydraulic pressure from the hydraulic pressure control valve 4 to the corresponding brake device $B_{LF}$, $B_{RF}$, $B_{LR}$, $B_{RR}$ when the output hydraulic pressure from the hydraulic pressure supply source 2 is normal, and functions to inhibit the working oil from reversely flowing from each of the brake devices $B_{LF}$, $B_{RF}$, $B_{LR}$ a $B_{RR}$ toward the hydraulic pressure supply source 2 when the hydraulic pressure from the hydraulic pressure supply source 2 is abnormally reduced.

Inlet valves $62_{LF}$ and $62_{RF}$ and outlet valves $63_{LF}$ and $63_{RF}$ are connected in parallel to the input hydraulic pressure chambers 56 in the unidirectional hydraulic pressure transmitting means $55_{LF}$ and $55_{RF}$ associated with the left and right front wheel brake devices $B_{LF}$ and $B_{RF}$. The brake devices $B_{LF}$ and $B_{RF}$ are mounted on the left and right front wheels which are drive wheels respectively. An inlet valve $62_R$ and an outlet valve $63_R$ are connected in parallel to the input hydraulic pressure chambers 56 in the unidirectional hydraulic pressure transmitting means $55_{LR}$ and $55_{RR}$ associated with the rear wheel brake devices $B_{LR}$ and $B_{RR}$, respectively.

The inlet valves $62_{LF}$, $62_{RF}$ and $62_R$ are normally-opened type solenoid valves which are closed during energization, and the outlet valves $63_{LF}$, $63_{RF}$ and $63_R$ are normally-closed type solenoid valves which are opened during energization. The outlet valves $63_{LF}$, $63_{RF}$ and $63_R$ are interposed between the inlet hydraulic pressure chambers 56 in the unidirectional hydraulic pressure transmitting means $55_{LF}$, $55_{RF}$, $55_{LR}$ and $55_{RR}$ and the reservoir R, respectively. The inlet valves $62_{LF}$ and $62_{RF}$ are interposed between the inlet hydraulic pressure chambers 56 in the unidirectional hydraulic pressure transmitting means $55_{LF}$ and $55_{RF}$ and an oil passage 64, respectively, and the inlet valve $62_R$ is interposed between the input hydraulic pressure chambers 56 in the unidirectional hydraulic pressure transmitting means $55_{LR}$ and $55_{RR}$ and an oil passage 65.

The oil passage 64 is connected to the oil passage 48 through a parallel circuit comprising a second differential pressure regulating valve 66 and a second one-way valve 67 parallel to the second differential pressure regulating valve 66. The second differential pressure regulating valve 66 is adapted to be opened in response to the hydraulic pressure in the oil passage 48 increasing by a predetermined value more than that in the oil passage 64 to permit only the flow of the working oil from the oil passage 48 toward the oil passage 64. The second one-way valve 67 is adapted to permit only the flow of the working oil from the oil passage 64 toward the oil passage 48, and the differential pressure for opening the second one-way valve 67 is set at an extremely low level. Further, the oil passage 65 is connected to the reaction chamber 32 in the hydraulic pressure control valve 4 and also to the output port 29 in the hydraulic pressure control valve 4 through the parallel circuit comprising the first differential pressure regulating valve 45 and the first one-way valve 46.

The left and right wheel brake devices of one of sets of the brake devices $B_{LF}$, $B_{RF}$, $B_{LR}$ and $B_{RR}$, i.e., the left front wheel brake $B_{LF}$ and the right rear wheel brake device $B_{RR}$ are interconnected through a first separating valve $68_1$, and the left and right wheel brake devices of the other set, i.e., the right front wheel brake device $B_{RF}$ and the left rear wheel brake device $B_{LR}$ are interconnected through a second separating valve $68_2$. The separating valves $68_1$ and $68_2$ both have basically the same construction and hence, the construction of only the first separating valve $68_1$ will be described below.

The first separating valve $68_1$ includes a cylindrical separating valve body 69 with its opposite ends closed. A valve bore 70 is provided in one end wall of the separating valve body 69 to communicate with the output hydraulic pressure chamber 57 in the unidirectional hydraulic pressure transmitting means $55_{RR}$. A separating piston 71 is slidably received in the separating valve body 69 and has at one end a valve member 71a capable of closing the valve bore 70. The other end of the separating piston is faced to a pilot chamber 72 defined between the separating piston 71 and the other end wall of the separating body 69. A spring 73 is interposed between the separating valve body 69 and the separating piston 71 to bias the separating piston 71 toward the pilot chamber 72

A valve chest 74 is defined between the one end wall of the separating valve body 69 and the separating piston 71 and is capable of communicating with the valve bore 70. Spring 73 is contained in the valve chest 74. The separating valve body 69 is also provided with an inlet port 75 which communicates with the valve chest 74 and with the output hydraulic pressure chamber 57 in the unidirectional hydraulic pressure transmitting means $55_{LF}$.

With such first separating valve $68_1$, if the hydraulic pressure in the pilot chamber 72 is lower than a given value, the separating piston 71 is moved toward the pilot chamber 72 to a position in which the valve member 71a opens the valve bore 70, thereby opening the valve, so that the output hydraulic pressure chambers 57 in the unidirectional hydraulic pressure transmitting means $55_{LF}$ and $55_{RR}$, i.e., the hydraulic braking pressure chambers 53 in the left front wheel brake device $B_{LF}$ and the right rear wheel brake device $B_{RR}$ are put into communication with each other. If the hydraulic pressure in the pilot chamber 72 becomes equal to or more than the given value, the separating piston 71 is moved to close the valve bore 70 by the valve member 71a, thereby closing the valve, so that the output hydraulic pressure chambers 57 in the unidirectional hydraulic pressure transmitting means $55_{LF}$ and $55_{RR}$, i.e., the hydraulic braking pressure chambers 53 in the left front wheel brake device $B_{LF}$ and the right rear wheel brake device $B_{RR}$ are put out of communication with each other.

The pilot chambers 72 in the separating valves $68_1$ and $68_2$ commonly communicate with the oil passage 76. The oil passage 76 is connected to the oil passage 48 through a normally-closed type solenoid valve 77, and a third one-way valve 78 is connected in parallel to the normally-closed type solenoid valve 77 for permitting only the flow of the working oil from the oil passage 76 to the oil passage 48. Thus, when the normally-closed type solenoid valve 77 is in its closed state, the separating valves $68_1$ and $68_2$ are in their opened states and hence, the left front wheel brake device $B_{LF}$ and the right rear wheel brake device $B_{RR}$ as well as the right front wheel brake device $B_{RF}$ and the left rear wheel brake device $B_{LR}$ are in communication with each other, respectively. When the normally-closed type solenoid valve 77 is opened by energization in a condition in which a hydraulic pressure equal to or more than a predetermined value acting on the oil passage 48, the separating valves $68_1$ and $68_2$ are closed, so that the left front wheel brake device $B_{LF}$ and the right rear wheel brake device $B_{RR}$ as well as the right front wheel brake device $B_{RF}$ and the left rear wheel brake device $B_{LR}$ are put out of communication with each other, respectively.

The first input pressure working chamber 34 in the hydraulic pressure control valve 4 is connected to the first output port 17 in the hydraulic pressure generating means 3, and is connected to the left front wheel brake device $B_{LF}$ through a hydraulic pressure regulating means $80_1$ and an on-off valve $81_1$. The second input pressure working chamber 35 in the hydraulic pressure control valve 4 is connected to the second output port 18 in the hydraulic pressure generating means 35, and is connected to the right front wheel brake device $B_{RF}$ through a hydraulic pressure regulating means $80_2$ and an on-off valve $81_2$.

The on-off valves $81_1$ and $81_2$ both have basically the same construction and hence only the construction of the on-off valve $81_1$ will be described below.

The on-off valve $81_1$ includes a cylindrical on-off valve body 82 with its opposite ends closed. A valve bore 83 is provided in one end wall of the on-off valve body 82 to communicate with the output hydraulic pressure chamber 57 in the unidirectional hydraulic pressure transmitting means $55_{LF}$. An opening and closing piston 84 is slidably received in the on-off valve body 82 and has at one end a valve member 84a capable of closing the valve bore 83. The other end of the piston 84 is faced to a pilot chamber 85 defined between the piston 84 and the other end wall of the on-off valve body 82. A spring 86 is interposed between the on-off valve body 82 and the opening and closing piston 84 for biasing the opening and closing piston 84 toward the pilot chamber 85.

A valve chest 87 is defined between the one end wall of the on-off valve body 82 and the opening and closing piston 84 and capable of communicating with the valve bore 83, and the spring 86 is contained in the valve chest 87. The on-off valve body 82 is also provided with an inlet port 88 which communicates with the valve chest 87 and is connected to the hydraulic pressure regulating means $80_1$.

With such on-off valve $81_1$, if the hydraulic pressure in the pilot chamber 85 is lower than a given value, the opening and closing piston 84 is moved toward the pilot chamber 85 to a position in which the valve member 84a opens the valve bore 83, thereby opening the valve. If the hydraulic pressure becomes equal to or more than the given value, the opening and closing piston 84 is moved to close the valve bore 83 by the valve member 84a, thereby closing the valve.

The pilot chamber 85 communicates with the oil passage 48. Thus, in a condition in which a higher hydraulic pressure is in the oil passage 48 and thus in the pilot chamber 85, the on-off valve $81_1$ is closed to put the hydraulic pressure regulating means $80_1$ and the left front wheel brake device $B_{LF}$ out of communication with each other. If the hydraulic pressure in the oil passage 48 is reduced, the on-off valve $81_1$ is opened to put the hydraulic pressure regulating means $80_1$ and the left front wheel brake device $B_{LF}$ into communication with each other.

The on-off valve $81_2$ is closed in a condition in which a higher hydraulic pressure is in the oil passage 48, thereby putting the hydraulic pressure regulating means $80_2$ and the right front wheel brake device $B_{RF}$ out of communication with each other. If the hydraulic pressure in the oil passage 48 is reduced, the on-off valve $81_2$ is opened to put the hydraulic pressure regulating means $80_2$ and the right front wheel brake device $B_{RF}$ into communication with each other.

The hydraulic pressure regulating means $80_1$ and $80_2$ both have basically the same construction and hence, only the construction of one hydraulic pressure regulating means $80_1$ will be described below, and the description of the construction of the other hydraulic pressure regulating means $80_2$ is omitted.

The hydraulic pressure regulating means 80 includes a fourth one-way valve 90 for permitting only the flow of the working oil from the first input pressure working chamber 34 toward the on-off valve $81_1$ in response to the output hydraulic pressure from the first output port 17 in the hydraulic pressure generating means 3, i.e., in response to the hydraulic pressure in the first input working chamber 34 exceeding a set pressure $P_1$. A fifth one-way valve 91 is connected in parallel to the fourth one-way valve 90 while permitting only the flow of the working oil from the side of the on-off valve $81_1$ toward the first input pressure working chamber 34.

The set pressure $P_1$ for the fourth one-way valve 90 is set at a value equal to or more than the hydraulic pressure in the first input pressure working chamber 34 required for operation of the hydraulic pressure control valve 4 until the on-off valve $81_1$ can be closed by the output hydraulic pressure from the output port 29 in the hydraulic pressure control valve 4. The fifth one-way valve 91 serves to release the hydraulic pressure in the hydraulic braking pressure chambers 53 in the left front wheel brake device $B_{LF}$ and the right rear wheel brake device $B_{RR}$ into the second reservoir R' in a condition in which the first and second working pistons 10 and 11 of the hydraulic pressure generating means 3 have been returned to their retreat limits upon completion of the braking operation. In this condition, the first hydraulic pressure chamber 12 is put into communication with the second reservoir R' through the communication port 19. The fifth one-way valve 91 is opened by a set pressure $P_2$. The set pressure $P_2$ is set such that no drag is produced in the brake devices $B_{LF}$ and $B_{RF}$ even if a hydraulic pressure corresponding to the set pressure $P_2$ is applied to the hydraulic braking pressure chamber 53.

Oil passages between the hydraulic pressure regulating means $80_1$ and $80_2$ and the on-off valves $81_1$ and $81_2$ are connected to the second reservoir R' through sixth one-way valves $92_1$ and $92_2$, respectively. The sixth one-way valves $92_1$ and $92_2$ are adapted to permit only the flow of the working oil from the second reservoir R' toward the corresponding hydraulic braking pressure chambers 53 in the brake devices $B_{LF}$, $B_{RF}$, $B_{LR}$ and $B_{RR}$. This can allow the piston 52 to be moved by a variation in temperature or the like in a condition in which the working pistons 10 and 11 of the hydraulic pressure generating means 3 have been returned to their retreat limits upon completion of the braking operation to put the first and second hydraulic pressure, chambers 12 and 13 into communication with the second reservoir R'. The pressure $P_3$ set by the sixth one-way valves $92_1$ and $92_2$ is set at a level such that the hydraulic braking pressure chamber 53 can be prevented from being brought into a negative pressure state.

The operation of the first embodiment will be described below. First, suppose that a normal braking operation is being conducted in a condition in which the hydraulic pressure supply source 2 is normally operative. In this case, the inlet valves $62_{LF}$, $62_{RF}$ and $62_R$ and the outlet valves $63_{LF}$, $63_{RF}$ and $63_R$ are in their deenergized states (as shown in FIG. 1), and the traction-controlling solenoid switchover valve 49 and the normally-closed type solenoid valve 77 are also in their deenergized state (as shown in FIG. 1). Therefore, the output port 29 in the hydraulic pressure control valve 4 is in communication with the input hydraulic pressure chambers 56 in the unidirectional hydraulic pressure transmitting means $55_{LF}$ and $55_{RF}$ through the oil passage 48, the second differential pressure regulating valve 66, the oil passage 64 and the inlet valves $62_{LF}$ and $62_{RF}$ as well as with the input hydraulic pressure chambers 56 in the unidirectional hydraulic pressure transmitting means $55_{LR}$ and $55_{RR}$ through the first differential pressure regulating valve 45, the oil passage 65 and the inlet valve $62_R$. In addition, the separating valves $68_1$ and $68_2$ are open and hence, the hydraulic braking pressure chambers 53 in the left front wheel brake device $B_{LF}$ and the right rear wheel brake device $B_{RR}$ are in communication with each other, and the hydraulic braking pressure chambers 53 in the right front wheel brake device $B_{RF}$ and the left rear wheel brake device $B_{LR}$ are in communication with each other.

When the brake pedal 1 is depressed in such condition, the first and second working pistons 10 and 11 in the hydraulic pressure generating means 3 are operated to advance, so that the hydraulic pressure developed in the first hydraulic pressure chamber 12 is accumulated in the accumulator 37 and applied to the first input pressure working chamber 34 in the hydraulic pressure control valve 4, while the hydraulic pressure developed in the second hydraulic pressure chamber 13 is applied to the second input pressure working chamber 35 in the hydraulic pressure control valve 4. This causes the urging piston 23 in the hydraulic pressure control valve 4 to advance, thereby driving the spool 22 to advance. The communication between the release port 30 and the output port 29 is cut off, and the output port 29 is put into communication with the input port 28, permitting the hydraulic pressure to be delivered through the output port 29. Moreover, the first differential pressure regulating valve 45 remains closed until the output hydraulic pressure from the output port 29 becomes larger than the hydraulic pressure in the reaction chamber 32 by the predetermined value.

Figure 2:
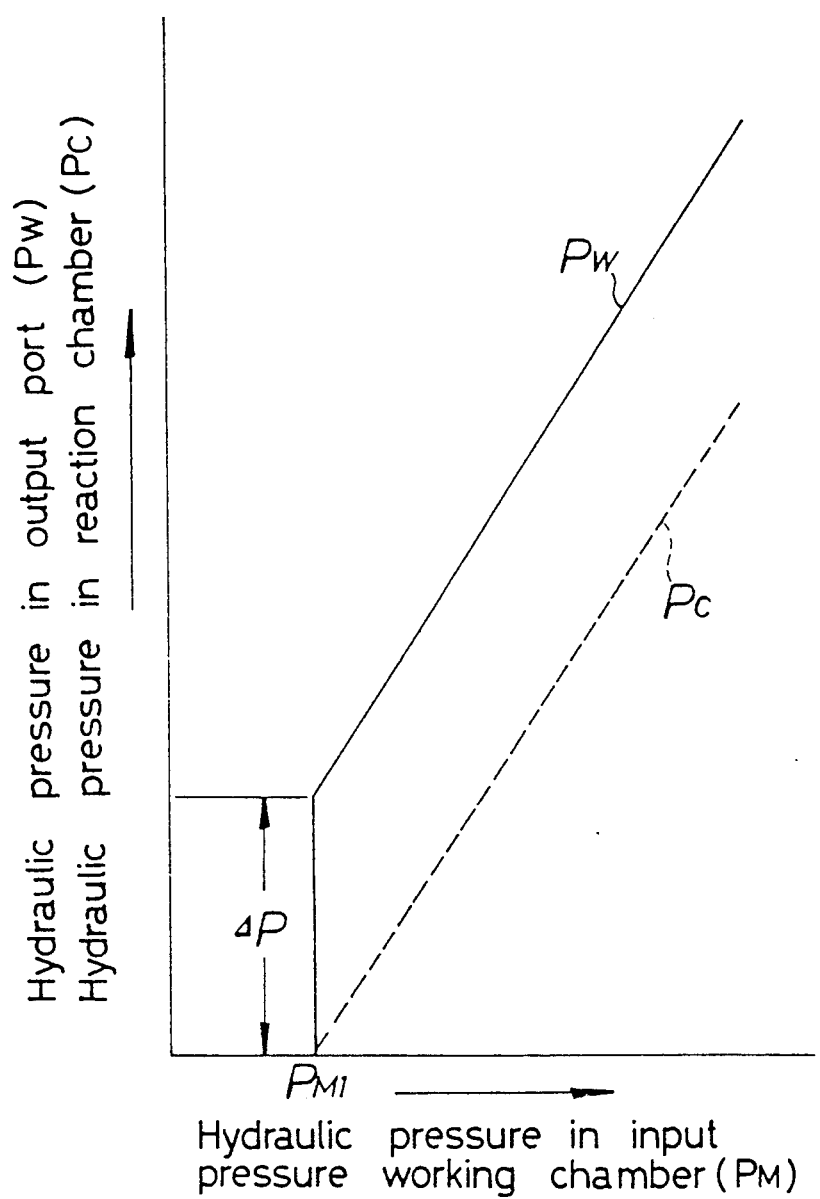
FIG. 2 is a graph illustrating a characteristic of an output hydraulic pressure from a hydraulic pressure control valve.

Therefore, at a point when the hydraulic pressure $P_M$ in the first and second input pressure working chambers 34 and 35 has reached a certain value $PM_1$ as shown in FIG. 2 to put the input port 28 into communication with the output port 29, the output hydraulic pressure $P_w$ from the output port 29 rapidly increases, so that the on-off valves $81_1$ and $81_2$ are closed, while at the same time, plays which may exist in operational movements of various members leading to the brake devices $B_{LF}$, $B_{RF}$, $B_{LR}$ and $B_{RR}$ are eliminated by supplying of a relatively high hydraulic pressure. As a result, the initial operation of the baking pistons 52 in the brake devices $B_{LF}$, $B_{RF}$, $B_{LR}$ and $B_{RR}$ is smoothed.

In this case, the hydraulic pressure is developed in the first and second hydraulic pressure chambers 12 and 13 in the hydraulic pressure generating means 3 in response to the depressing operation of the brake pedal 1, but it cannot be applied to the brake devices $B_{LF}$, $B_{RF}$, $B_{LR}$ and $B_{RR}$ until the on-off valves $81_1$ and $81_2$ are closed by the functioning of the fourth one-way valves 90 in the hydraulic pressure regulating means $80_1$ and $80_2$.

When the differential pressure $\Delta P$ between the output hydraulic pressure $P_w$ from the output port 29 and the hydraulic pressure $P_c$ in the reaction chamber 32 has reached a certain value, the first differential pressure regulating valve 45 is opened, so that the hydraulic pressure from the output port 29 is applied to the reaction chamber 32. This causes an increased hydraulic pressure in the reaction chamber 32 to act on the spool 22 rearwardly, thereby retreating the spool 22 to put the output port 29 out of communication with the input port 28. If the brake pedal 1 is further depressed, the spool 22 advances again in response to the increase in hydraulic pressure in the first and second hydraulic pressure chambers 12 and 13, thereby putting the output port 29 into communication with the input port 28. In this way, in response to the braking operation of the brake pedal 1, the spool 22 is reciprocally moved between the front position in which the output port 20 communicates with the input port 28 and the rear position in which the output port 29 communicates with the release port 30, thereby ensuring that the hydraulic pressure from the hydraulic pressure supply source 2 is controlled in accordance with the amount of braking operation of the brake pedal 1 and is delivered through the output port 29.

Figure 3:
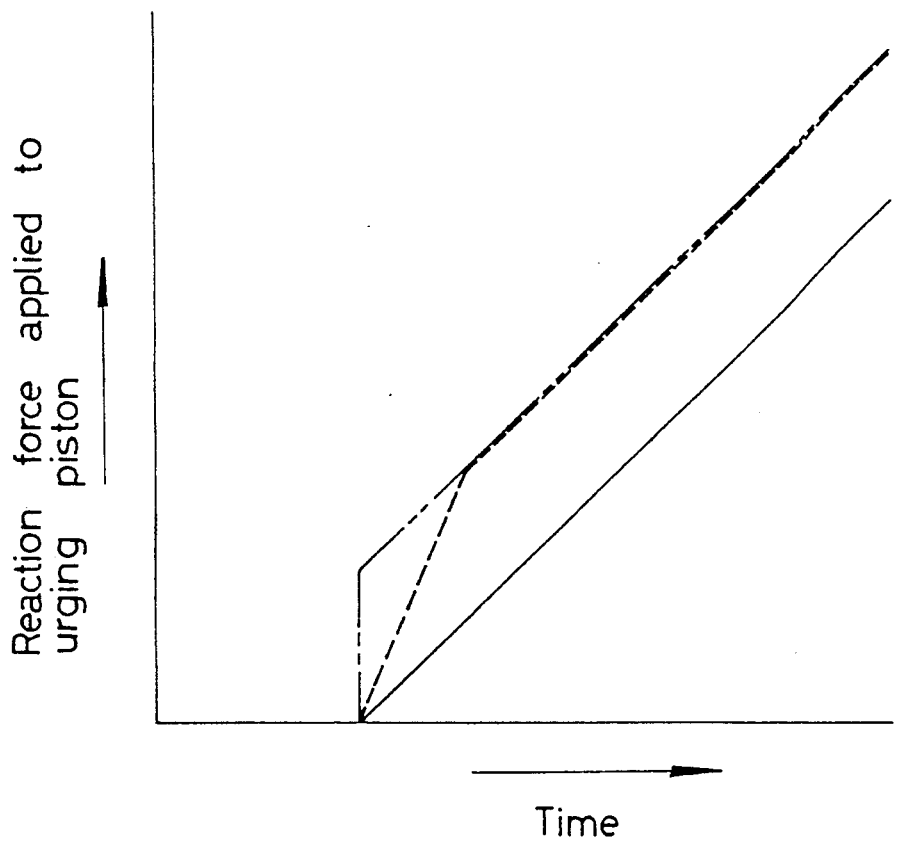
FIG. 3 is a graph illustrating a characteristic of a reaction force applied to an urging piston in the hydraulic pressure control valve.

Moreover, if the hydraulic pressure in the reaction chamber 32 is rapidly developed with the output hydraulic pressure $P_w$ from the output port 29 increasing rapidly at an initial stage of braking as described above, a rapid reaction force acts on the urging piston 23, i.e., on the brake pedal 1, as shown by a dashed line in FIG. 3, when the pressure absorbing means 24 is not provided, whereas the reaction force on the urging piston 23, i.e., the reaction force on the brake pedal 1 as shown by a solid line in FIG. 3 can be reduced by movement of the damper piston 40 of the pressure absorbing means 24 away from the regulating collar 43 while compressing the damper spring 41, thereby providing a smooth pedal feel.

At the time of the above-described opening of the first differential pressure regulating valve 45, the second differential pressure regulating valve 66 is also opened. In response to opening of the first and second differential pressure regulating valves 45 and 66 after closing of the on-off valves $81_1$ and $81_2$ the hydraulic pressure from the output port 29 is applied to the input hydraulic pressure chambers 56 in the unidirectional hydraulic pressure transmitting means $55_{LF}$ and $55_{RF}$ via the oil passage 48, the second differential pressure regulating valve 66, the oil passage 64 and the inlet valves $62_{LF}$ and $62_{RF}$, thereby providing a braking pressure in each of the left and right front wheel brake devices $B_{LF}$ and $B_{RF}$. In addition, the hydraulic pressure from the output port 29 is applied to the input hydraulic pressure chambers 56 in the unidirectional hydraulic pressure transmitting means $55_{LR}$ and $55_{RR}$ via the first differential pressure regulating valve 45, the oil passage 65 and the inlet valve $62_r$, thereby providing a braking pressure in each of the left and right rear wheel brake devices $B_{LR}$ and $B_{RR}$. Moreover, the braking pressures in the left front wheel brake device $B_{LF}$ and the right rear wheel brake device $B_{RR}$ are equal and the braking pressures in the right front wheel brake device $B_{RF}$ and the left rear wheel brake device $B_{LR}$ are also equal, because both of the separating valves $68_1$ and $68_2$ have been opened. Therefore, it is possible to avoid an imbalance from being produced in the left and right braking pressures.

The separating valves $68_1$ and $68_2$ are interposed between the output hydraulic pressure chambers 57 in the unidirectional hydraulic pressure transmitting means $55_{LF}$ and $55_{RR}$ and between the output hydraulic pressure chambers 57 in the unidirectional hydraulic pressure transmitting means $55_{RF}$ and $55_{LR}$, respectively and hence if a trouble occurs in one of the left front wheel brake device $B_{LF}$ and the right rear wheel brake device $B_{RR}$ to cause a reduction in braking pressure, then the braking pressures of the left front wheel brake device $B_{LF}$ and the right rear wheel brake device $B_{RR}$ are equally reduced, but the reduction in braking pressure of the right front wheel brake device $B_{RF}$ and the left rear wheel brake device $B_{LR}$ can be avoided by the fact that the hydraulic pressure from the hydraulic pressure control valve 4 is applied to the input hydraulic pressure chambers 56 in the unidirectional hydraulic pressure transmitting means $55_{RF}$ and $55_{LR}$ associated with the right front wheel brake device $B_{RF}$ and the left rear wheel brake device $B_{LR}$.

In this manner, the hydraulic pressure from the hydraulic pressure supply source 2 can be controlled in accordance with the amount of braking operation and provided to the brake devices $B_{LF}$, $B_{RF}$, $B_{LR}$ and $B_{RR}$, but the brake devices $B_{LF}$, $B_{RF}$, $B_{LR}$ and $B_{RR}$ are isolated from the hydraulic circuit extending from the input hydraulic pressure chambers 56 to the hydraulic pressure supply source 2 by the free pistons 58 in the unidirectional hydraulic pressure transmitting means $55_{LF}$, $55_{RF}$, $55_{LR}$ and $55_{RR}$. Therefore, air which might be incorporated into the working oil in sucking the oil from the reservoir R in the hydraulic pressure supply source 2 cannot adversely affect each of the brake devices $B_{LF}$, $B_{RF}$, $B_{LR}$ and $B_{RR}$.

Further, a sufficient stroke of the brake pedal 1 can be provided by accumulating the hydraulic pressure from the first hydraulic pressure chamber 12 in the hydraulic pressure generating means 3 by the accumulator 37. This ensures that a construction for providing the sufficient stroke is unnecessary, thereby making it possible to provide a reduction in size of the hydraulic pressure control valve. Moreover, a direct action of a rapid reaction force on the brake pedal 1 can be avoided by a damper effect provided by the accumulator 37.

When the depression force applied to the brake pedal 1 is excessively increased during such braking, so that a wheel is about to be locked, the normally-closed type solenoid valve 77 is opened by energization and both the separating valves $68_1$ and $68_2$ are closed, thereby isolating the left front wheel brake device $B_{LF}$ and the right rear wheel brake device $B_{RR}$ from each other and the right front wheel brake device $B_{RF}$ and the left rear wheel brake device $B_{LR}$ from each other. In addition, the inlet valve $62_{LF}$, $62_{RF}$, $62_R$ associated with the wheel about to be locked is closed by energization. More specifically, if the left front wheel is about to be locked, the inlet valve $62_{LF}$ is closed to isolate the unidirectional hydraulic pressure transmitting means $55_{LF}$ and the oil passage 64 from each other. If the right front wheel is about to be locked, the inlet valve $62_{RF}$ is closed to isolate the unidirectional hydraulic pressure transmitting means $55_{RF}$ and the oil passage 64 from each other. If both rear wheels are about to be locked, the inlet valve $62_R$ is closed to isolate the unidirectional hydraulic pressure transmitting means $55_{LF}$ and $55_{RR}$ and the oil passage 65 from each other. This suppresses the increase in braking force to avoid the locking of the wheel which is about to be locked. If the wheel is still about to enter a locked state, then the associated inlet valve $63_{LF}$, $63_{RF}$ and $63_R$ are energized to bring the input hydraulic pressure chamber 56 in the unidirectional hydraulic pressure transmitting means $55_{LF}$, $55_{RF}$, $55_{LR}$, $55_{RR}$ into communication with the reservoir R, so that the braking pressure is reduced. This enables the locking tendency of the wheel to be eliminated. More specifically, by closing the separating valves $68_1$ and $68_2$ and independently controlling the inlet valves $62_{LF}$, $62_{RF}$ and $62_R$ and the outlet valves $63_{LF}$, $63_{RF}$ and $63_R$, it is possible to independently control the braking forces of the left front wheel brake device $B_{LF}$ and the right front wheel brake device $B_{RF}$ and to control the braking pressures of the left and right rear wheel brake devices $B_{LR}$ and $B_{RR}$ independently from the front wheel brake devices $B_{LF}$ and $B_{RF}$.

Suppose that a higher hydraulic pressure cannot be provided from the hydraulic pressure supply source 2 due to a trouble with the hydraulic pump 5 or the like during the above-described braking. In this case, the on-off valves $81_1$ and $81_2$ are opened in response to a reduction in hydraulic pressure from the output port 29 in the hydraulic pressure control valve 4. Therefore, the hydraulic braking pressures developed in the first and second hydraulic pressure chambers 12 and 13 in the hydraulic pressure generating means 3 are applied directly to each of the brake devices $B_{LF}$ to $B_{RR}$, thereby insuring equal braking forces on the left and right sides. During this time, the braking pressure of each of the brake devices $B_{LF}$ to $B_{RR}$ cannot escape toward the hydraulic pressure control valve 4.

During non-braking after completion of the braking operation, the on-off valves $81_1$ and $81_2$ are opened by a reduction in hydraulic pressure in the oil passage 48, enabling the supplying of the working oil from the reservoir R' through the sixth one-way valves $92_1$ and $92_2$ to the output hydraulic pressure chamber 57 in each of the unidirectional hydraulic pressure transmitting means $55_{LF}$ to $55_{RR}$. In addition, it is possible to put the input hydraulic pressure chambers 56 in the unidirectional hydraulic pressure transmitting means $55_{LF}$ and $55_{RF}$ into communication with the reservoir R through the inlet valves $62_{LF}$ and $62_{RF}$, the second one-way valve 67, the traction-controlling solenoid switchover valve 49 and the hydraulic pressure control valve 4. It is also possible to put the input hydraulic pressure chambers 56 in the unidirectional hydraulic pressure transmitting means $55_{LR}$ and $55_{RR}$ into communication with the reservoir R through the first one-way valve 46 and the hydraulic pressure control valve 4. This causes the free piston 58 n each of the unidirectional hydraulic pressure transmitting means $55_{LF}$ to $55_{RR}$ to be quickly moved toward the input hydraulic pressure chamber 56 without the generation of a negative pressure in the output hydraulic pressure chamber 57. For this reason, it is unnecessary to specially provide a reservoir. Moreover, the first one-way valve 46 also serves to release the hydraulic pressure in the reaction chamber 32 in the hydraulic pressure control valve 4 to the reservoir R. Further, If the normally-closed type solenoid valve 77, so far in its opened state, is closed by energization during non-braking after completion of the braking operation, the hydraulic pressure in the pilot chambers 72 in each of the separating valves $68_1$ and $68_2$ is released toward the reservoir R through the third one-way valve 78 and the hydraulic pressure control valve 4.

It is also supposed that the hydraulic pressure in the input hydraulic pressure chamber 56 may be increased due to an increase in temperature in each of the unidirectional hydraulic pressure transmitting means $55_{LF}$ to $55_{RR}$ during non-braking. In such a case, if the hydraulic pressure cannot be released, a braking pressure may be applied. However, the set pressure for opening each of the first and second one-way valves 46 and 67 is set at a small value and therefore, such valves 46 and 67 can be opened in response to an increase in hydraulic pressure in the input hydraulic pressure chamber 56 to release the working oil in an amount corresponding to an increment of the hydraulic pressure.

Further, if the driving force of the engine becomes excessively large, i.e., if the left and right front wheels are about to slip excessively, the traction-controlling solenoid switchover valve 49 is energized. This causes a higher hydraulic pressure from the hydraulic pressure supply source 2 to be applied to the input hydraulic pressure chambers 56 in the unidirectional hydraulic pressure transmitting means $55_{LF}$ and $55_{RF}$, so that a braking force is produced in each of the brake devices $B_{LF}$ and $B_{RF}$ on the left and right wheels which are drive wheels. Thus, the generation of an excessive slipping is avoided. Thereafter, it is possible to control the braking force by controlling the energization and deenergization of the inlet valves $62_{LF}$ and $62_{RF}$ and the outlet valves $63_{LF}$ and $63_{RF}$ in the same manner as during the above-described anti-lock control.

In such hydraulic braking pressure control system for a vehicle, the left front wheel brake device $B_{LF}$ and the right rear wheel brake device $B_{RR}$ as well as the right front wheel brake device $B_{RF}$ and the left rear wheel brake device $B_{LR}$ are interconnected through the separating valves $68_1$ and $68_2$, and it is possible to switch-over the connection and disconnection between the left front wheel brake device $B_{LF}$ and the right rear wheel brake device $B_{RR}$ as well as between the right front wheel brake device $B_{RF}$ and the left rear wheel brake device $B_{LR}$ by controlling the opening and closing the individual separating valves $68_1$ and $68_2$. Thus, it is possible to easily switchover the condition in which the left and right braking forces are equally applied and the condition in which the left and right braking forces are independently controlled, thereby accommodating the anti-lock control and the traction control.

Although, in the above first embodiment, the first separating valve $68_1$ has been interposed between the left front wheel brake device $B_{LF}$ and the right rear wheel brake device $B_{RR}$ and the second separating valve $68_2$ has been interposed between the right front wheel brake device $B_{RF}$ and the left rear wheel brake device $B_{LR}$, it is to be understood that the first separating valve $68_1$ may be interposed between the left front wheel brake device $B_{LF}$ and the right front wheel brake device $B_{RF}$, and the second separating valve $68_2$ may be interposed between the left rear wheel brake device $B_{LR}$ and the right rear wheel brake device $B_{RR}$.

In addition, the hydraulic system from the left and right front wheel brake devices $B_{LF}$ and $B_{RF}$ to the hydraulic pressure control valve 4 may be different from the hydraulic system from the left and right rear wheel brake devices $B_{LR}$ and $B_{RR}$ to the hydraulic pressure control valve 4, and the hydraulic system from the all brake devices $B_{LF}$, $B_{RF}$, $B_{LR}$ and $B_{RR}$ to the hydraulic pressure control valve 4 may be common.

Figure 4:
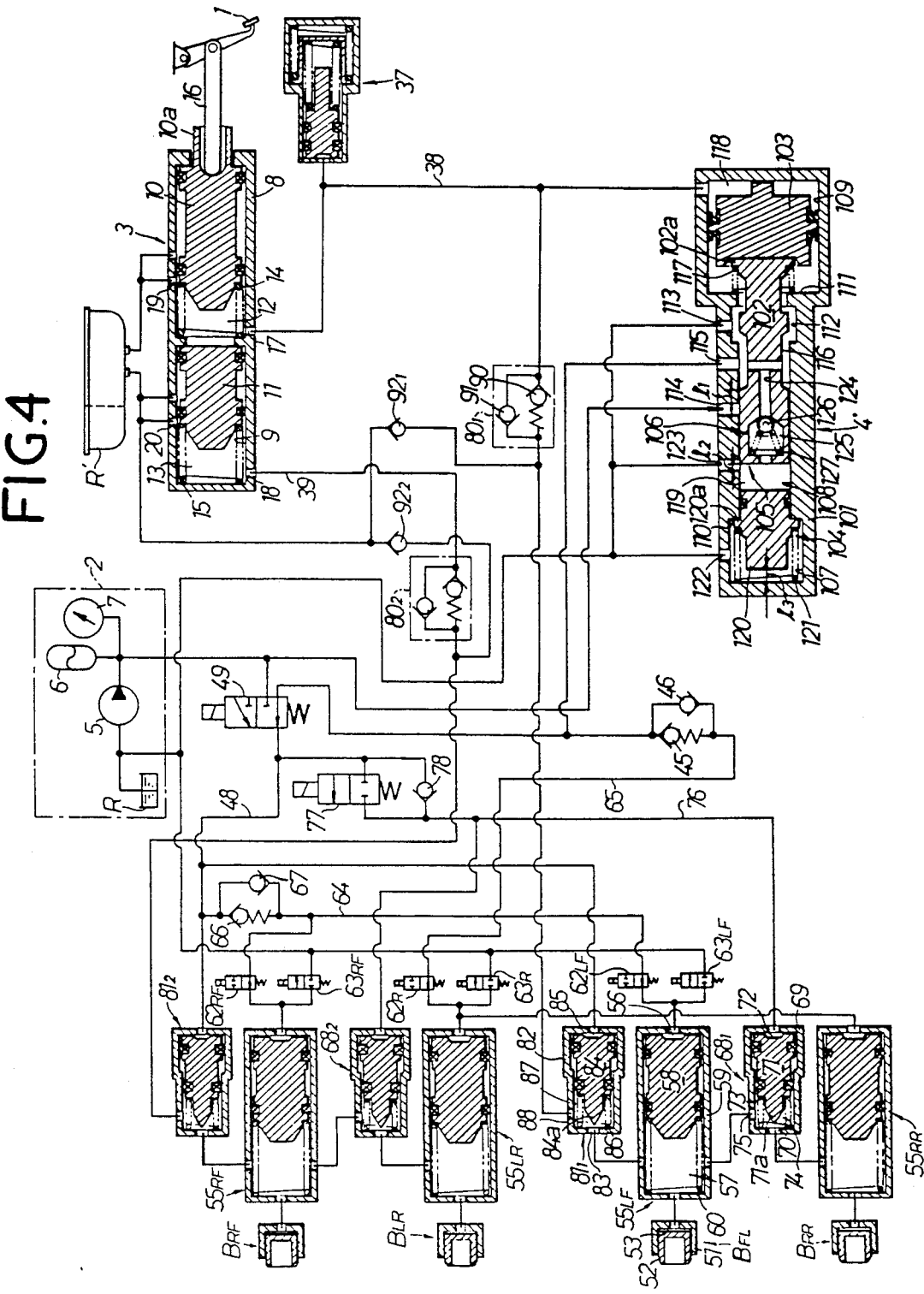
FIGS. 4 and 5 are schematic diagrams of entire hydraulic circuits of a second and a third embodiment, respectively.

FIG. 4 illustrates a second embodiment of the present invention, wherein components or parts corresponding to those in the previous first embodiment are identified by the same reference characters.

A hydraulic pressure control valve 4' comprises a housing 101, a spool 102 and an urging piston 103 which are slidably received in the housing 101, and a pressure absorbing means 104.

The housing 101 is basically formed into a cylindrical shape with its opposite ends closed and is provided, in sequence from its front end side (left end side as viewed in FIG. 4), with a first bore 107 with its front end closed, a second bore 108 having a diameter smaller than that of the first bore 107 and coaxially connected to a rear end of the first bore 107, and a third bore 109 with its rear end closed, which has a diameter larger than that of the second bore 108 and is coaxially connected to a rear end of the second bore 108. There are a step 110 between the first bore 107 and the second bore 108 and a step 111 between the second bore 108 and the third bore 109, and a annular recess 112 is provided on an inner surface of the second bore 108 closer to the third bore 109 Moreover, the housing 101 is provided with a release port 113 opened into the annular recess 112 and leading to the reservoir R. Further, the housing 101 is provided with an input port 114 opened in an inner surface of the second bore at its middle portion and an output port 115 opened in the inner surface of the second bore 108 between the input port 114 and the release port 113. The input port 114 is connected to the hydraulic pressure supply source 2, and the output port 115 is connected to the hydraulically operated devices, i.e., the brake devices $B_{LF}$, $B_{RF}$, $B_{LR}$ and $B_{RR}$ through a hydraulic circuit similar to that shown in FIG. 1.

The spool 102 is slidably received in the second bore 108 with its outer surface in direct sliding contact with the inner surface of the second bore 108. An annular groove 116 is provided in an outer surface of the spool 102 and communicates with the output port 115 all the time. The axial length of the annular groove 116 is set so that the output port 115 and the annular recess 112, i.e., the release port 113 are put into communication with each other when the spool 102 is in a rear position as shown in FIG. 4, and the output port 115 and the input port 114 are put into communication with each other when the spool 102 is in a front position.

A rear end of the spool 102 projects from the second bore 108 into the third bore 109. A spring 117 is provided in a compressed manner between a collar 102a provided at the rear end of the spool 102 (and projecting radially inward) and the step 111, so that the spool 102 is biased rearwardly by a spring force of the spring 117.

The urging piston 103 is slidably received in the third bore 109 to define an input pressure working chamber 118 between the piston and a rear end wall in the housing 101 and abuts at its front end against a rear end of the spool 102 biased by the spring 117. The first hydraulic pressure chamber 12 in the hydraulic pressure generating means 3 for producing a hydraulic pressure according to the depressing operation of the brake pedal 1 is connected to the input pressure working chamber 118.

The pressure absorbing means 104 is comprised of a damper piston 120 slidably received in a front end portion of the second bore 108 to define a reaction chamber 119 between the piston 120 and the front end of the spool 102, and a damper spring 121 provided in a compressed manner between a front end wall of the housing 101 and the damper piston 120 to bias the damper piston 120 rearwardly, i.e., toward the reaction chamber 119. A radially outwardly projecting regulating collar 120a is projectingly provided on the damper piston 120 and adapted to abut against the step 110 to regulate return limit. The housing 101 is also provided with a communication port 122 which permits a chamber defined between the front end wall of the housing 101 and the damper piston 120 to communicate with the reservoir R.

A shut-off valve 105 is interposed between the reaction chamber 119 and the reservoir R and adapted to be closed in response to the advancing movement of the spool 102. The shut-off valve 105 is comprised of a valve bore 123 provided in the housing 101 and opened into the second bore 108 to communicate with the reservoir R, and the front end portion of the spool 102. The position of the valve bore 123 is determined so that when the spool 102 is in the rear position as shown in FIG. 4, the valve bore 123 is open and when the spool 102 is advanced, the valve bore 123 is closed by the front end of the spool 102.

A differential pressure regulating valve 106 is disposed in the spool 102 and adapted to be opened in response to the hydraulic pressure in the output port 115, i.e., in the annular groove 116 becoming larger than the hydraulic pressure in the reaction chamber 119 by a predetermined value. The differential pressure regulating valve 106 comprises a valve bore 124 provided in the spool 102 to communicate with the annular groove 116 a valve chest 125 provided in the spool 102, a valve sphere 126 contained in the valve chest 125 to open and close the valve bore 124, and a valve spring 127 contained in the valve chest 125 to bias the valve sphere 126 in a valve closing direction. The valve bore 124 having one end communicating with the annular groove 116 is opened into the valve chest 125, and the valve sphere 126 is contained in the valve chest 125 so that it can be seated on that end of the valve bore 124 which is opened into the valve chest 126.

In such hydraulic pressure control valve 4', a rearward spring force provided by the spring 117 and a rearward hydraulic pressure provided by the hydraulic pressure in the reaction chamber 119 act on the spool 102. On the other hand, a hydraulic pressure from the input pressure chamber 118 acts forwardly on the urging piston and hence, the spool 102 is moved axially to balance the rearward force and the forward hydraulic pressure.

When the forward hydraulic pressure provided by the hydraulic pressure in the input pressure working chamber 118 overcomes the rearward force to cause the spool 102 to be moved forwardly, the output port 115 and the input port 114 are put into communication with each other. When the rearward force overcomes the forward hydraulic pressure provided by the hydraulic pressure in the input pressure working chamber 118 to cause the spool 102 to be moved rearwardly, the output port 115 and the release port 113 are put into communication with each other.

A relationship $l_3 > l_1 - l_2$ is established wherein a distance $l_1$ through which the spool 102 moves from its retreat limit position (a position shown in FIG. 4) until the input port 114 is put into communication with the output port 115, a distance $l_2$ through which the spool 102 in the retreat limit position moves until it closes the shut-off valve 105, and a distance $l_3$ between the front end of the damper piston 120 and the front end wall of the housing 101 when the spool 102 is in the retreat limit position.

The operation of the second embodiment will be described below. In the hydraulic pressure control valve 4', the urging piston 103 is advanced in response to a hydraulic pressure applied to the input pressure working chamber 118, thereby advancing the spool 102 whose rear end is in abutment against the urging piston 103. At a point when the spool 102 has been advanced through a distance of $l_1$, the communication between the release port 113 and the output port 115 is cut off and at the same time, the output port 115 is put into communication with the input port 114. The shut-off valve 105 has been already closed to isolate the reaction chamber 119 from the reservoir R. This permits the hydraulic pressure in the reaction chamber 119 to be increased in response to the advancing movement of the spool 102, but a portion of an increment of the hydraulic pressure is absorbed by the advancing movement of the damper piston 120, and the differential pressure regulating valve 106 remains closed until the output hydraulic pressure from the output port 115 becomes higher than the hydraulic pressure in the reaction chamber 119 by a predetermined value.

Therefore, as shown in FIG. 2, the output hydraulic pressure $P_w$ from the output port 115 is suddenly increased at a point when the hydraulic pressure $P_M$ in the input pressure working chamber 118 has reached a certain value $PM_1$ to put the input port 114 into communication with the output port 115.

If the differential pressure $\Delta P$ between the output hydraulic pressure $P_w$ from the output port 115 and the hydraulic pressure $P_c$ in the reaction chamber 119 reaches a certain value, the differential pressure regulating valve 106 is opened, so that the hydraulic pressure from the output port 115 is applied to the reaction chamber 119. For this reason, an increased hydraulic pressure in the reaction chamber 119 is applied rearwardly to the spool 102, thereby retreating the spool 102 to put the output port 115 out of communication with the input port 114. Further, the spool 102 is advanced again in response to an increase in amount of braking operation, thereby putting the output port 115 into communication with the input port 114. In this manner, the spool 102 is reciprocally moved in accordance with the amount of braking operation between a front position in which the output port 115 communicates with the input port 114 and a rear position in which the output port 115 communicates with the release port 113. This ensures that the hydraulic pressure from the hydraulic pressure supply source 2 is controlled in accordance with the amount of braking operation and delivered through the output port 115.

Moreover, even if the hydraulic pressure in the reaction chamber 119 is rapidly developed when the output hydraulic pressure $P_w$ from the output port 115 at an initial stage of braking as described above, the reaction force acting on the urging piston 103, i.e., on the brake pedal 1 is gradually increased as shown by a dashed line in FIG. 3 by movement of the damper piston 120 of the pressure absorbing means 104 in a direction to increase the volume of the reaction chamber 119. This makes it possible to provide an improved pedal feel.

It should be noted that the first differential pressure regulating valve 45 in the second embodiment functions to avoid that the hydraulic pressure from the hydraulic pressure control valve 4' is applied to the unidirectional hydraulic pressure transmitting means $55_{LR}$ and $55_{RR}$, until the on-off valves $81_1$ and $81_2$ are closed.

In a modification of the second embodiment, the spring 117 in the hydraulic pressure control valve 4' may be omitted, and the projection protruding rearwardly from the rear end of the damper piston 120 may be disposed to abut against the front end of the spool 102. In this case, the distance 13 between the front end of the damper piston 120 and the one end wall of the housing 101 is set at a value larger than the distance through which the spool 102 is moved.

Figure 5:
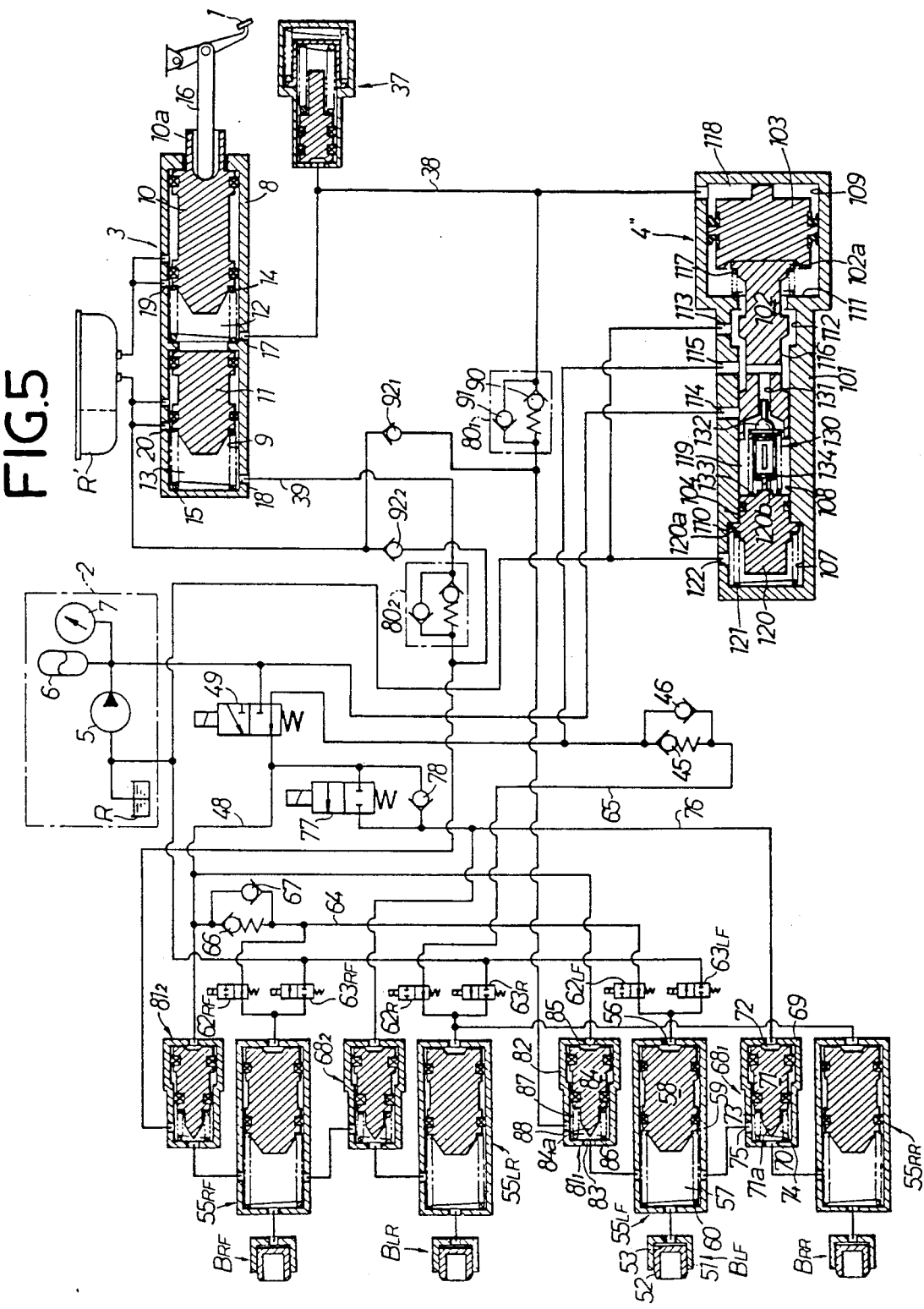

FIG. 5 illustrates a third embodiment of the present invention, wherein components or parts corresponding to those in the above-described embodiments are identified by the same reference characters.

A hydraulic pressure control valve 4" includes a control mechanism 130 which has the function of a shut-off valve adapted to shut off the communication between the reaction chamber 119 and the reservoir R when the spool 102 is in a front position to permit the communication between the input port 114 and the output port 115, and has the function of a differential pressure regulating valve adapted to be opened to guide the hydraulic pressure from the output port 115 to the reaction chamber 119 when the output hydraulic pressure from the output port 115 becomes larger than the hydraulic pressure in the reaction chamber 119 by a predetermined value.

The control mechanism 130 includes a valve bore 131 provided in the spool 102 with one end communicating with the output port 115. A valve member 132 is contained in the reaction chamber 110 to be able to open and close that end of the valve bore 131 which is opened into the reaction chamber 119. A valve spring 133 is provided under compression between the damper piston 120 and the valve member 132 to bias the valve member 132 in a direction to close the valve bore 131. An engage member 134 is provided to extend between the damper piston 120 and the valve member 132 in order to regulate the amount of valve member 132 moved. One end of the engage member 134 is engaged with a locking portion 120b projectingly provided on the rear end of the damper piston 120 for axial relative movement in a limited extent, and the other end of the engage member 134 is fixed to the valve member 132.

In the control mechanism 130, when the spool 102 is in a rear position in which the input port 114 communicates with the release port 113 as shown in FIG. 5, the valve member 132 regulated in the amount of movement by the engage member 134 is in a position in which it opens the valve bore 131. When the spool 102 has been advanced to a front position in which the input port 114 communicates with the output port 115, the valve member 132 assumes a position in which it closes the valve bore 131, for movement in a valve opening direction. Therefore, with the spool 102 in the rear position, the reaction chamber 119 is in communication with the reservoir R through the valve bore 131 and the release port 113. When the spool 102 has been advanced to the front position, the reaction chamber 119 is isolated from the reservoir R, and the output port 115 and the reaction chamber 119 are put into communication with each other by a valve-opening operation of the control mechanism 130 responsive to the output hydraulic pressure from the output port 115 becoming larger than the hydraulic pressure in the reaction chamber 119.

Even with the third embodiment, an effect similar to that in each of the previous embodiments can be provided.

In an alternate embodiment of the present invention, a chamber between the damper piston 120 and the housing 101 may be opened to the atmosphere in place of communicating with the reservoir R. In addition, a metal or rubber diaphragm may be provided as a pressure absorbing means on the housing to face to the reaction chamber 119.

Although the embodiments of the present invention have been described as being applied to the hydraulic braking control system, it will be understood that the present invention is also applicable to a boosting system for a hydraulic clutch.

We claim:

1. A hydraulic pressure control system, comprising:
   a hydraulic pressure control valve including a housing having an output port connected to hydraulically operated means, an input port communicating with a hydraulic pressure supply source, and a release port communicating with a reservoir; and further including
   a spool slidably received in the housing for axial movement between a rear position permitting communication between the output port and the release port and a front position permitting communication between the input port and the output port;
   a reaction chamber defined in the housing and connected to the output port to provide a hydraulic pressure for biasing the spool toward the rear positions; and
   an input pressure working chamber means defined in the housing to provide a hydraulic pressure for biasing the spool toward the front position;
   said hydraulic pressure control system further comprising a differential pressure regulating valve interposed between the output port and the reaction chamber, such that said differential pressure regulating valve is opened in response to the hydraulic pressure from the output port becoming higher than the hydraulic pressure in the reaction chamber by a predetermined value.

2. The hydraulic pressure control system of claim 1, wherein said hydraulic pressure control valve is provided with a shut-off valve interposed between the reaction chamber and the reservoir, such that said shut-off valve is closed in response to the forward movement of the spool.

3. The hydraulic pressure control system of claim 1, further including a one-way valve which is connected in parallel to the differential pressure regulating valve and only permits the flow of working fluid through the one-way valve in a direction toward the output port.

4. The hydraulic pressure control system of any one of claims 1-3, wherein said hydraulically operated means is a brake device, and further comprising:
   a hydraulic pressure generating means, connected to a brake pedal, for producing a hydraulic pressure according to the amount of operation of the brake pedal, said hydraulic pressure generating means being connected to the input pressure working chamber means in the hydraulic pressure control valve;
   a unidirectional hydraulic pressure transmitting means, interposed between the brake device and the reaction chamber, the transmitting means arranged to transmit the hydraulic pressure of the reaction chamber to the brake device and to cut off the flowing of working fluid from the brake device toward the reaction chamber even when the hydraulic pressure in said hydraulic pressure supply source is abnormally reduced; and
   an on-off valve interposed between said hydraulic pressure generating means and said brake device, such that said on-off valve is closed in response to an increase in output hydraulic pressure from said output port.

* * * * *